United States Patent [19]
Deschepper et al.

[11] Patent Number: 6,070,215
[45] Date of Patent: May 30, 2000

[54] COMPUTER SYSTEM WITH IMPROVED TRANSITION TO LOW POWER OPERATION

[75] Inventors: Todd J. Deschepper, Spring; Robert C. Elliott, Houston, both of Tex.

[73] Assignee: Compaq Computer Corporation, Houston, Tex.

[21] Appl. No.: 09/042,326

[22] Filed: Mar. 13, 1998

[51] Int. Cl.[7] .................................................. G06F 13/38
[52] U.S. Cl. .......................................... 710/129; 713/320
[58] Field of Search .................................. 710/107, 126, 710/128, 129; 713/300, 320

[56] References Cited

U.S. PATENT DOCUMENTS

| | | | |
|---|---|---|---|
| 5,634,073 | 5/1997 | Collins et al. | 395/825 |
| 5,644,734 | 7/1997 | Hong | 395/309 |
| 5,717,873 | 2/1998 | Rabe et al. | 395/290 |
| 5,764,924 | 6/1998 | Hong | 395/281 |
| 5,764,933 | 6/1998 | Richardson et al. | 395/308 |
| 5,778,235 | 7/1998 | Robertson | 395/728 |
| 5,862,358 | 1/1999 | Ervin et al. | 395/309 |
| 5,898,888 | 4/1999 | Guthrie et al. | 395/308 |
| 5,906,659 | 5/1999 | Derrick et al. | 710/52 |

OTHER PUBLICATIONS

VLSI Digital Signal Processors by Vijay K. Madisetti (Georgia Institute of Technology) Chapter 3, pp. 61–63; Butterworth–Heinemann.

*Primary Examiner*—Ayaz R. Sheikh
*Assistant Examiner*—Jigar Pancholi
*Attorney, Agent, or Firm*—Conley, Rose & Tayon, P.C.; Michael F. Heim; Jonathan M. Harris

[57] ABSTRACT

A computer system includes a South bridge logic device that monitors the FLUSHREQ signal and masks that signal when the CPU transitions the computer to a low power mode of operation. Once masked, the FLUSHREQ cannot be asserted to the North bridge and the conflict between attempts by the CPU and an ISA device to run cycles on the PCI bus is avoided. The South bridge also masks all requests to run cycles on the PCI bus that are not originated by the CPU. The South bridge includes a programmable control register and a PCI arbiter. When a control bit is set in the register, the PCI arbiter waits for FLUSHREQ to be deasserted and then masks FLUSHREQ. The PCI arbiter preferably also disables PCI arbitration by masking all non-CPU. Only the CPU can run PCI cycles when the non-CPU requests are masked. The programmable control register also includes a masking status bit that is set when both the FLUSHREQ and non-CPU request signals are masked by a request mask state machine. The computer system may also include a laptop computer docked to an expansion base with a South bridge included in the computer and the expansion base.

27 Claims, 6 Drawing Sheets

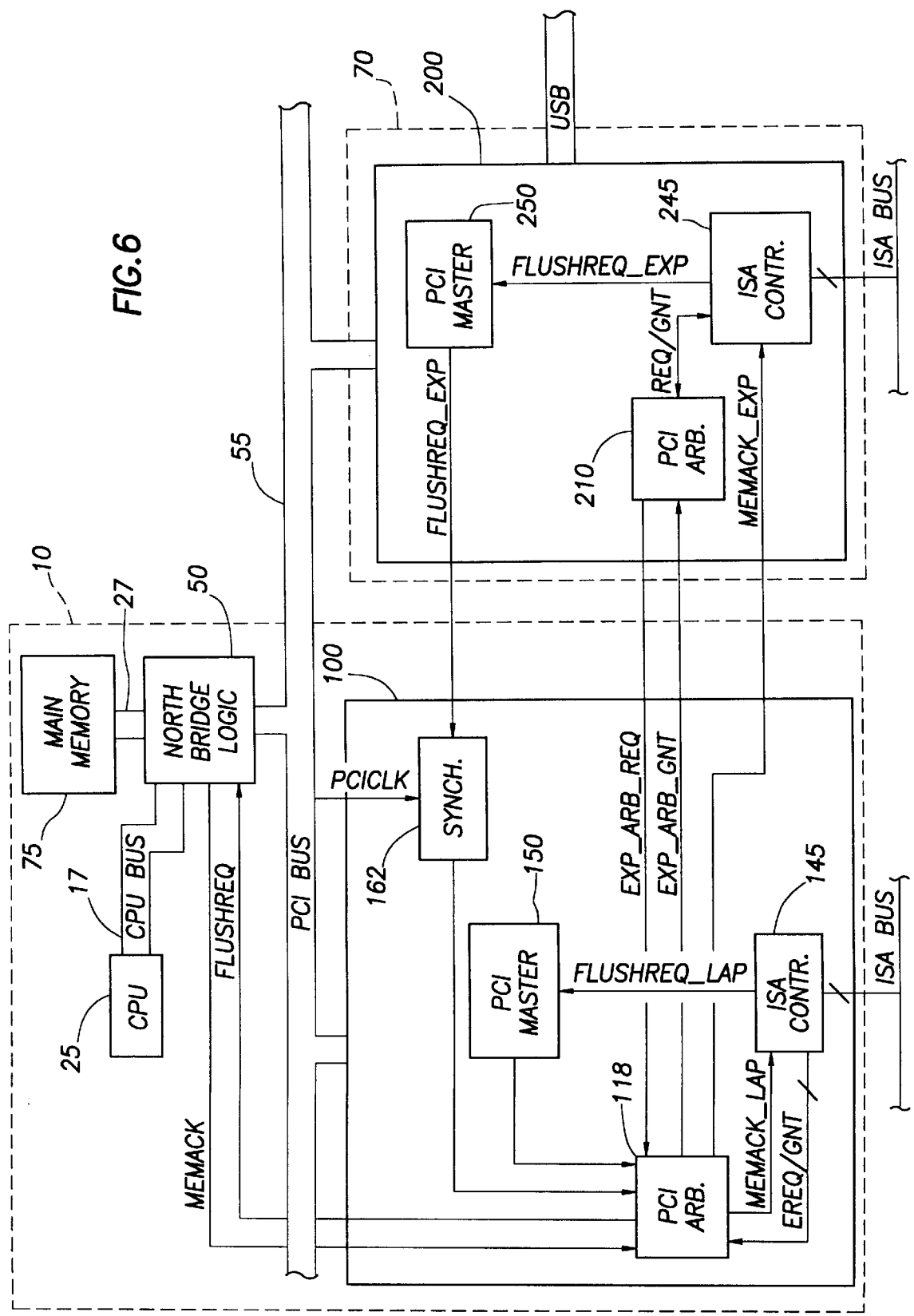

COMPUTER SYSTEM WITH IMPROVED TRANSITION TO LOW POWER OPERATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to computer systems. More particularly, the present invention relates to circuitry that forms a communications "bridge" between components in a personal computer system. Still more particularly, the present invention relates to a bridge logic device that implements an improved sequence for transitioning the computer to a low power mode of operation.

2. Background of the Invention

A personal computer system includes a number of components with specialized functions that cooperatively interact to produce the many effects available in modern computer systems. The ability of these various components to exchange data and other signals is vital to the successful operation of a computer system. Most, if not all, personal computers (PC's) include a processor (or CPU), random access memory (RAM) comprising the computer's main or system memory, and a variety of input and output devices such as a keyboard, mouse, trackball, display (or monitor) to name a few. Typically, the CPU controls most of the activities of the computer system. The CPU supervises data flow and is responsible for most of the high-level data manipulation in the computer. The CPU, therefore, is the brains of the computer system and receives signals from the peripheral devices, reads and writes data to memory, processes data, and generates signals controlling the peripheral devices.

As the processing demands of computer operators have become more sophisticated, PC's have been incorporated with additional hardware such as modems, CD ROM drives, digital video disk (DVD) drives, sound cards, video cards, and scanners. The components of the PC listed above, as well as other devices not listed, are generally interconnected by one or more "busses."

A bus is a collection of digital lines generally including address, data, and control signals. A typical bus interconnects two or more devices. The bus provides an efficient way to transfer data or commands from one device on the bus to another device also connected to the bus. To facilitate communication between bus devices, each bus device is given a unique identifier or address. Thus, one device (the "sending" device) can transfer data to another device (the "receiving" device) by placing an address unique to the receiving device on the bus along with the data to be transferred. The sending device asserts various control signals to initiate the data transfer. All of the other bus devices examine the address, but only the device to which the address corresponds will download the data from the bus.

One early bus that still is in use today is the ISA (Industry Standard Architecture) bus. The ISA bus, as the name implies, was a bus standard adopted by computer manufacturers to permit the manufacturers of peripheral devices to design devices that would be compatible with computer systems of most computer companies. The ISA bus includes 16 data lines and 24 address lines and operates at a clock speed of 8 MHz. A number of peripheral components have been developed over the years to operate with the ISA protocol.

Since the introduction of the ISA bus, computer technology has continued to evolve at a relatively rapid pace. New peripheral devices have been developed, and both processor speeds and the size of memory arrays have increased dramatically. In conjunction with these advances, designers have sought to increase the ability of the system bus to transfer more data at a faster speed. One way in which the system bus has been made more effective is to permit data to be exchanged in a computer system without the assistance of the CPU. To implement this design, however, a new bus protocol had to be developed. One such bus that permits peripheral devices to run cycles independently of the CPU as a "master" device is the EISA (Extended Industry Standard Architecture) bus. The EISA bus enables various system components residing on the EISA bus to obtain mastership of the bus and to run cycles on the bus. Another bus that has become increasingly popular is the Peripheral Component Interconnect (PCI) bus. Like the EISA bus, the PCI bus has bus master capabilities. The PCI bus also operates at a clock speed of 33 MHz or faster.

Because of the bus mastering capabilities and other advantages of the PCI (and EISA) bus, many computer manufacturers now implement one or the other of these busses as the main system bus in the computer system. Because of the proliferation of devices that had been developed for the ISA bus, the computer manufacturers also continued to provide an ISA bus as part of the computer system to permit the use of the many peripheral devices that operated under that protocol. To further provide flexibility, some computer manufacturers provide all three busses in the same computer system to permit users to connect peripheral devices of all three protocols to the computer system. Io implement these various busses in the same computer system, special bridge logic circuit has been developed to interface to the various busses.

Thus, the PC generally includes multiple busses, such as PCI bus, an ISA bus, and an EISA bus, as well as other busses such as a Pentium® bus and a Small Computer Systems Interface (SCSI) bus. Devices connected to a particular bus must comply with a particular protocol for communicating with other devices on the same bus. The protocol varies between the bus standards. For example, the way devices communicate with each after over a PCI bus generally differs from the way devices on an ISA bus communicate.

FIG. 1 shows a representative prior art computer system that includes a CPU coupled to a bridge logic device via a CPU bus. This bridge logic device is sometimes referred to as a "North bridge" for no other reason than it often is depicted at the upper end of a computer system drawing. The North bridge also couples to the main memory array by a memory bus. The North bridge couples the CPU and memory to the peripheral devices in the system through a PCI bus or other expansion bus (such as an EISA bus). Various components that understand PCI protocol may reside on the PCI bus, such as a graphics controller.

If other expansion busses are provided in the computer system, another bridge logic device typically is used to couple the PCI bus to that expansion bus. This bridge logic is sometimes referred to as a "South bridge" reflecting its location vis-a-vis the North bridge in a typical computer system drawing. In FIG. 1, the South bridge couples the PCI bus to an ISA bus. Various ISA-compatible devices are shown coupled to the ISA bus. Exemplary bridge logic also is described in U.S. Pat. No. 5,634,073, assigned to Compaq Computer Corporation.

The application entitled "Computer System With Memory Controller and Bridge Interface Permitting Concurrent Operation," assigned to Compaq Computer Corp. describes a North bridge which includes a number of write request and read data storage queues to facilitate concurrent flow of write requests and data through the bridge. Such a bridge device permits the computer system to operate more efficiently. Cycle information flowing concurrently through the bridge between pairs of busses (for example, from the CPU bus to the memory bus) creates the potential for certain data coherency problems. These coherency problems, in part, are a result of the characteristics of one or more of the busses connected to the bridge.

By way of example, many bus protocols today implement the concept of "retry." Referring still to FIG. 1, if the graphics controller needs to read data from memory, but the memory is busy servicing an access request from the CPU, the North bridge can retry the graphics controller's read request. That is, the North bridge asserts a signal to the graphics controller directing the graphics controller to retry its read request at a later time. Retrying the cycle frees up the PCI bus to perform other transfers rather than waiting for access to memory.

Other reasons exist for retrying a PCI cycle. For example, retrying a PCI read from memory may be needed to avoid a data "coherency" problem. Generally, it is important for a write cycle to run before a read cycle. To solve this problem, the PCI standard requires any write cycles in the North bridge pending to be run on the PCI bus to be executed before permitting a PCI read to run. The North bridge generally includes a CPU-to-PCI write queue in which the CPU stores write cycles to be run on the PCI bus. The North bridge is responsible for running those cycles. If a PCI read is initiated, the North bridge must first run all write cycles pending in its CPU-to-PCI queue before the PCI read can run. The process of running all pending write cycles in the queue is referred to as "flushing" the queue. The North bridge retries the PCI read cycle while it flushes its write queue.

This methodology for overcoming a possible data coherency problem does not work in some situations. Case in point is the ISA bus. The ISA standard generally does not permit an ISA device to be retried. Accordingly, once an ISA device is granted ownership of the ISA bus to run a read cycle to memory for example, the South bridge must also obtain ownership of the PCI bus so that the cycle can go through to memory without delay. Once the South bridge obtains ownership of the PCI bus on behalf of an ISA device, the South bridge will not relinquish ownership until the ISA cycles completes and the data is read from memory. A conflict thus occurs between the PCI rule that a read cycle first requires the North bridge to flush its internal CPU-to-PCI write queue and the inability of the South bridge to relinquish control of the PCI bus to permit the North bridge to flush its queue.

To overcome this problem, the South bridge and North bridge implement a pair of control signals—flush request (FLUSHREQ) and memory acknowledge (MEMACK). Before granting an ISA device ownership of the ISA bus and obtaining ownership of the PCI bus, the South bridge first asserts FLUSHREQ to the North bridge. In response to FLUSHREQ, the North bridge flushes all CPU-to-PCI write requests pending in the CPU-to-PCI write queue. The North bridge also disallows the CPU from posting additional CPU-to-PCI write requests to the queue (referred to as a "no post" condition). After flushing the CPU-to-PCI write queue and placing the CPU into a no post condition disallowing additional write cycles to be posted to the queue, the North bridge asserts MEMACK back to the South bridge. Upon detecting MEMACK active, the South bridge may then proceed with the ISA cycle according to standard convention.

Although this technique solves the problem noted above, another problem may occur. Many computers include various low power modes of operation. These low power modes are particularly important for portable computers that often run off battery power. A portable computer may include an "idle" mode, a "standby" mode, and a "hibernation" mode, for example. In the standby mode, the computer effectively is turned off except for main memory which continues to be refreshed to preserve the memory contents. The computer may transition into the standby mode if the operator presses a particular button or a predetermined period of time has elapsed during which the computer has been inactive (i.e., the operator has pressed no keys and the computer has otherwise done nothing other than refresh memory). Pressing the same button again brings the computer back to its full operational state.

The hibernation mode is similar to the standby mode except the contents of main memory are copied to a file on the hard drive and the computer effectively is turned off. Once the computer transitions back to its full operational mode (by pressing a particular button), the main memory is restored from the hard drive file and the computer can then continue normal operation. The hibernation mode generally requires less battery power than the standby mode because the battery is not used to refresh memory during hibernation.

The computer's CPU usually is tasked with the primary responsibility of transitioning the computer into the desired low power mode. These responsibilities generally include disabling various functions in the computer and then indicating to an I/O controller that the CPU has completed the task of placing the computer into the low power mode. Some of the steps taken by the CPU to transition the computer to the low power mode of operation involves the CPU running one or more cycles on the PCI bus. For example, the CPU will run a PCI cycle to indicate to the I/O controller that the computer is prepared for the low power mode. The I/O controller will respond to this indication from the CPU by turning off power to a predetermined set of devices in the computer such as the hard drive and floppy drive.

Another step performed during the transition to the low power mode is disabling arbitration of the PCI bus. A PCI arbiter, which is a logic unit that may be included in the South bridge, determines which device connected to the PCI bus will be given control of the bus for each transaction on the bus. Disabling PCI arbitration precludes any device from running a PCI cycle. The only exception is the CPU which is permitted continued access to the PCI bus. Continued PCI access for the CPU is necessary to place the computer in the low power mode.

The problem noted above that the FLUSHREQ/ MEMACK protocol could create is if the South bridge asserts FLUSHREQ and the CPU then needs to run a cycle on the PCI bus with FLUSHREQ active. Because the North bridge responds to FLUSHREQ by keeping the CPU from initiating new cycles to the PCI bus, the CPU will not be able to run a PCI cycle. Thus the CPU will not be able to signal the I/O controller to turn power off. Further, because PCI arbitration may be disabled by the CPU as it attempts to transition the computer to the low power mode, the ISA device that caused the South bridge to assert FLUSHREQ will not be permitted access to the PCI bus to complete the cycle it desires. At this point the computer may "lock up." The CPU cannot access the PCI bus (because FLUSHREQ is asserted) to complete the transition to the low power mode and the ISA device which caused the FLUSHREQ cannot access the PCI bus (because PCI arbitration is disabled). Both activities are at a standstill and are unable to complete.

It thus would be desirable to complete the transition to the low power mode of operation without the computer locking up because of an outstanding FLUSHREQ signal. A computer system is needed that solves this problem.

SUMMARY OF THE INVENTION

The problems outline above are in large part solved by a computer system that includes a South bridge logic device that monitors the FLUSHREQ signal and masks that signal when the CPU transitions the computer to a low power mode of operation. Once masked, the FLUSHREQ cannot be asserted to the North bridge and the conflict between attempts by the CPU and an ISA device to run cycles on the PCI bus is avoided. The South bridge also masks all requests to run cycles on the PCI bus that are not originated by the CPU.

In accordance with one aspect of the invention, the South bridge includes a programmable control register and a PCI arbiter. The control register can be configured to mask the FLUSHREQ and non-CPU requests for access to the PCI bus. Accordingly, bit 1 of the control register is the PCI request mask request bit and, when set, causes the PCI arbiter to monitor the FLUSHREQ signal. The PCI arbiter waits for FLUSHREQ to be deasserted, which may be the case currently or will be after the current ISA cycle completes, and then masks FLUSHREQ. The PCI arbiter includes a logic gate, preferably an AND gate, that AND's together a flush request signal generated internal to the South bridge and a flush request mask signal generated by a request mask state machine. The request mask state machine asserts the flush request mask signal when FLUSHREQ is deasserted. The PCI arbiter preferably also includes another AND gate for masking all non-CPU requests in response to a non-CPU mask signal asserted by the request mask state machine. Masking the non-CPU requests effectively disables PCI arbitration. Only the CPU can run PCI cycles when the non-CPU requests are masked.

The programmable control register also includes a masking status bit (bit 3) that is set, preferably by the PCI arbiter, when both the FLUSHREQ and non-CPU request signals are masked by the request mask state machine. When the computer system is to transition to a low power state, the CPU runs a cycle through a North bridge, across the PCI bus, and to the South bridge to set the PCI request mask bit in the programmable control register. In response to that bit being set, the request mask state machine asserts its flush request mask signal when the FLUSHREQ signal is or becomes deasserted. The request mask state machine also masks all non-CPU requests for access to the PCI bus, thereby preventing any device, other than the CPU from running a PCI cycle and preventing FLUSHREQ from being asserted. When the masking is complete, the PCI arbiter sets the masking status bit. The CPU may read the status bit and continue with the power mode transition when the status bit is set.

In accordance with another aspect of the invention, the computer system may comprise a laptop computer connected ("docked") to an expansion base. The laptop computer and the expansion base preferably each include a South bridge device. The PCI arbiter in the laptop includes a pair of logic gates, preferably AND gates, for individually masking flush request signals from each South bridge. The laptop's PCI arbiter also includes an OR gate to combine the output signals from the pair of flush request AND gates, thereby asserting a single FLUSHREQ to the North bridge if either South bridge asserts its flush request signal. The laptop's PCI arbiter also masks all non-CPU requests for access to the PCI bus. All three AND gates receive masking signals from a request mask state machine as described above.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

FIG. 6 is an alternative embodiment of the invention illustrating the use of South bridges in the portable computer as well as in an expansion base.

The following detailed description provides in more detail the preferred embodiment for implementing the underlying principles of the present invention. One skilled in the art should understand, however, that the following description is meant to be illustrative of the present invention, and should not be construed as limiting the principles discussed herein. In addition, certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF PREFERRED EMBODIMENTS

Figure 1:
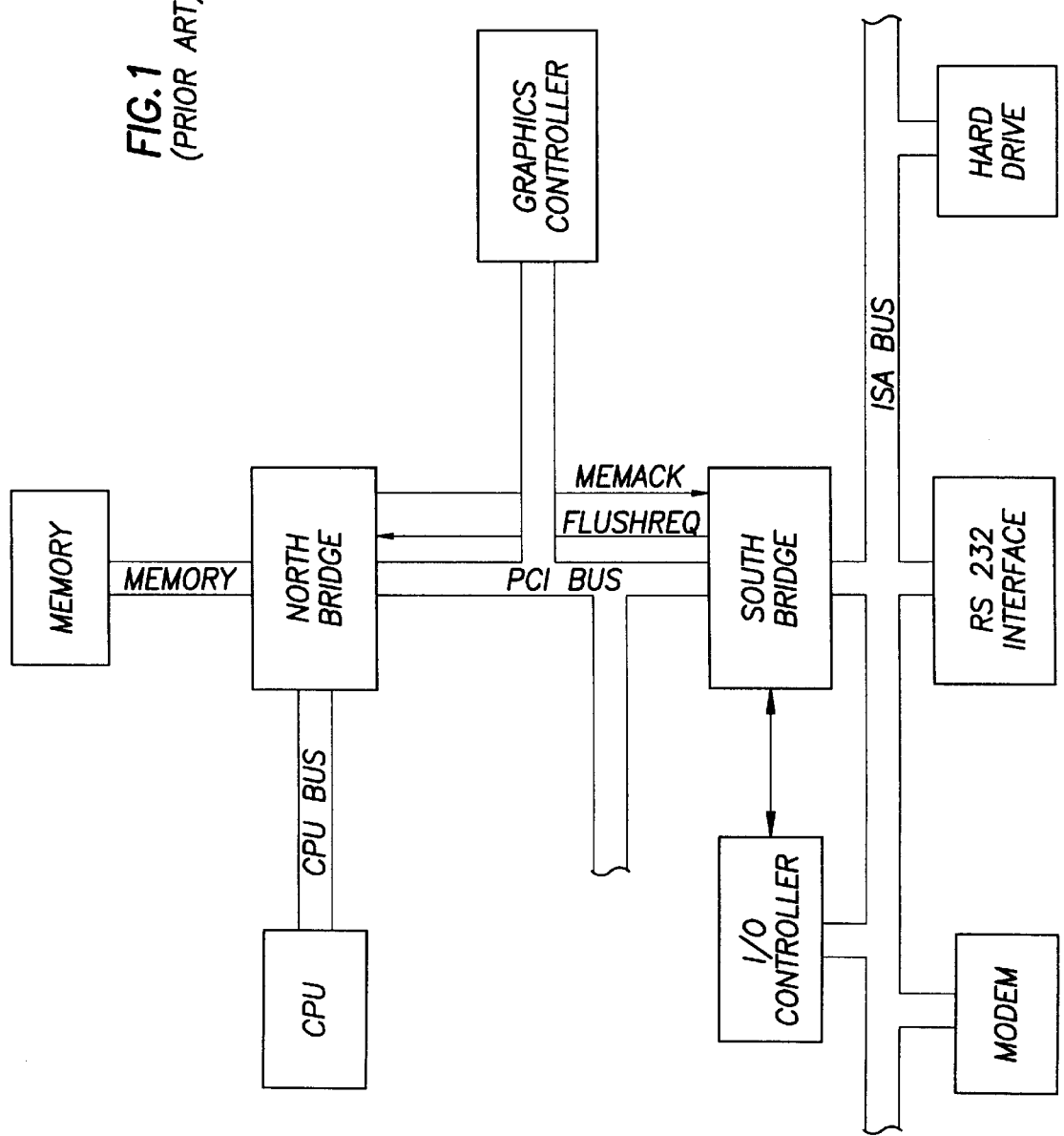
FIG. 1 is a block diagram of a prior art computer system implementing bridge logic units for coupling together dissimilar busses.
Figure 2:
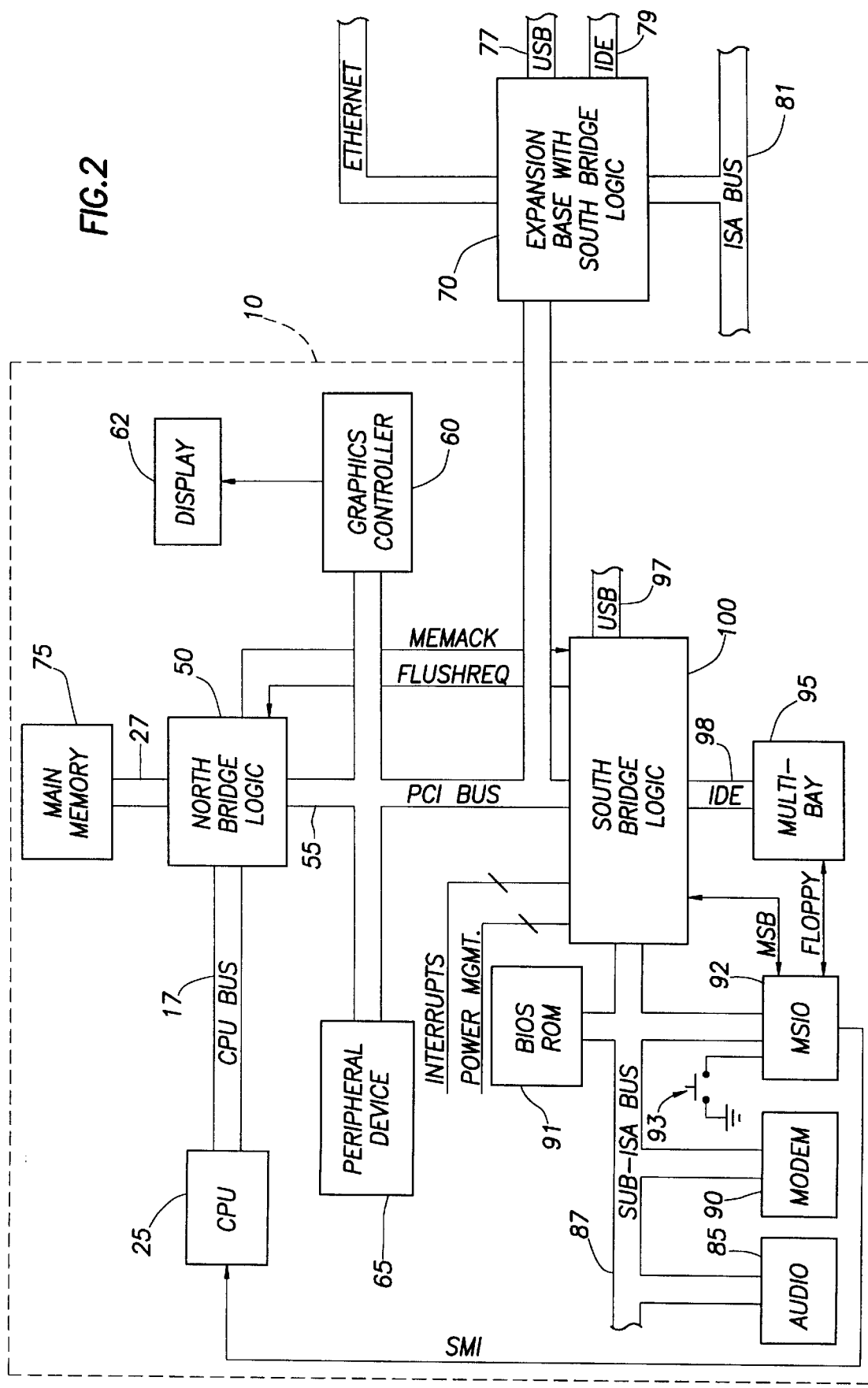
FIG. 2 is a block diagram of a portable computer system constructed in accordance with the preferred embodiment of the present invention with an improved South bridge logic unit coupled to a North bridge logic unit.

Referring now to FIG. 2, a computer system 10 constructed in accordance with the preferred embodiment generally includes a processor or CPU 25 coupled to a main memory array 75 and a variety of other peripheral computer system components through an integrated bridge logic device 50. As depicted in FIG. 2, the bridge logic 50 sometimes is referred to as a "North bridge." The CPU preferably couples to bridge logic 50 via a CPU bus 17, or the bridge logic 50 may be integrated into the CPU 25. The CPU 25 may comprise, for example, a Pentium® II microprocessor. It should be understood, however, that other alternative types of microprocessors could be employed. Further, an embodiment of computer system 10 may include multiple processors, with each processor coupled through the CPU bus 17 to the bridge logic unit 50.

The main memory array 75 preferably couples to the bridge logic unit 50 through a memory bus 27, and the bridge logic 50 preferably includes a memory control unit (not shown) that controls transactions to the main memory 75 by asserting the necessary control signals during memory accesses. The main memory 75 functions as the working memory for the CPU 25 and generally includes a conventional memory device or array of memory devices in which application programs and data are stored. The main memory array may comprise any suitable type of memory such as dynamic random access memory ("DRAM") or any of the various types of DRAM devices such as synchronous dynamic random access memory ("SDRAM") or extended data out dynamic random access memory (EDO DRAM).

The computer system 10 also preferably includes a graphics controller 60 that couples to the bridge logic 50 via an expansion bus 55 as shown in FIG. 2. Alternatively, the graphics controller 60 may couple to bridge logic 50 through an Advanced Graphics Port ("AGP") bus (not specifically shown). As one skilled in the art will understand, the graphics controller 60 controls the rendering of text and images on a display device 62. The graphics controller 60 may embody a typical graphics accelerator generally known in the art to render three-dimensional data structures on display 62. These data structures can be effectively shifted into an out of main memory 75 via the expansion bus and bridge logic 50. The graphics controller 60 therefore may be a master of the expansion bus (including either PCI or AGP bus) enabling the graphics controller 60 to request and receive access to a target interface within the bridge logic unit 50, including the memory control unit. This mastership capability permits the graphics controller 60 to access main memory 75 without the assistance of the CPU 25. A dedicated graphics bus accommodates rapid retrieval of data from main memory 106. As will be apparent to one skilled in the art, the bridge logic 50 includes a PCI interface to permit master cycles to be initiated and received by bridge logic 50. If an AGP bus is included in the system, the bridge logic 50 also includes an interface for initiating and receiving cycles to and from components on the AGP bus. The display 62 comprises any suitable electronic display device upon which an image or text can be represented. A suitable display device may include, for example, a cathode ray tube ("CRT"), a liquid crystal display ("LCD"), a thin film transistor ("TFT"), a virtual retinal display ("VRD"), or any other type of suitable display device for a computer system.

In the preferred embodiment, the expansion bus 55 comprises a Peripheral Component Interconnect (PCI) bus. The present invention, however, is not limited to any particular type of expansion bus, and thus various busses may be used including a high speed (66 MHz or faster) PCI bus. In the preferred embodiment, a plurality of PCI peripheral devices 65 reside on the PCI bus 55. The PCI devices may include any of a variety of peripheral devices such as, for example, network interface cards (NIC's), video accelerators, audio cards, hard or floppy disk drives, PCMCIA drives, Small Computer Systems Interface ("SCSI") adapters and telephony cards. Although only one PCI peripheral device 65 is depicted in FIG. 2, it should be recognized that computer system 10 may include any number of PCI devices as desired.

Computer system 10 preferably represents a laptop computer. If desired, as shown in FIG. 2 computer system 10 can be connected to an expansion base 70 via the PCI bus 55. This should not be construed, however, as limiting the present invention to a laptop. The present invention also may be used with a desktop system, work station, server, or handheld computer. In addition and as mentioned above, computer system 10 can be implemented with respect to the particular bus architectures shown in FIG. 2 (i.e., PCI bus), or other bus architectures, as desired. The embodiment described herein, however, assumes bus 55 represents a PCI bus, as shown in FIG. 2, and thus the following discussion will focus on configuring the present invention for that embodiment. Further, CPU 25 preferably comprises a Pentium® II processor and thus CPU bus 17 represents a Pentium II bus®. These bus protocols and the terminology used with respect to these protocols are well known to those of ordinary skill in the art. If a more thorough understanding of the PCI, or Pentium® II bus is desired, reference should be made to the PCI Local Bus Specification (1993), and Intel P6 External Bus Specification. If an AGP bus also is used in the computer system, reference may be made to the Accelerated Graphics Port Interface Specification (Intel, 1996).

Referring still to FIG. 2, a bus expansion device 100 also preferably connects to expansion bus 55. Bus expansion device 100 preferably comprises a bridge logic device and, as such, is referred to as a "South bridge." South bridge 100 couples or "bridges" the primary expansion bus 55 to other secondary expansion busses. These other secondary expansion busses may include an ISA (Industry Standard Architecture) bus, a sub-ISA bus, a USB (Universal Serial Bus), an IDE bus, an IEEE 1394 standard (or "Fire Wire") bus, or any of a variety of other busses that are available or may become available in the future. In the preferred embodiment of FIG. 2, the South bridge logic 100 couples to a sub-ISA bus 87, a USB bus 97 and an IDE bus 98. As will be apparent to one skilled in this art, various peripheral devices may be coupled to each of these busses. Thus, as shown in the preferred embodiment of FIG. 2, an MSIO (Mobile Super I/O) chip 92 connects to the sub-ISA bus, as does an audio card 85, modem 90 and BIOS ROM 91. Similarly, according to the preferred embodiment, a multi-bay configuration couples to the IDE bus 98 and to the MSIO 92. The multi-bay configuration preferably includes three independent bays connected in any master/slave, primary/secondary configuration supporting hot-plugging of IDE devices in the bays. As one skilled in the art will understand various IDE devices are available including CD ROM drives, floppy drives, tape drives, and the like. The USB 97 supports various peripherals, especially video peripherals such as video cameras for teleconferencing purposes. In addition to the busses discussed above, the South bridge also preferably connects to interrupt signal lines, power management signal lines, and a MSB (MSIO Serial Bus).

As noted above, the computer system 10 preferably comprises a laptop computer, and if desired to be used in a traditional desktop environment, an expansion base 70 preferably is available for connecting the laptop computer system to additional peripheral devices and to a computer network via an Ethernet bus. The expansion base may include any type of configuration, including a port replicator or docking station. The present invention envisions, however, that the expansion base also includes a South bridge logic (not shown specifically in FIG. 2) for coupling components on the PCI bus 55 to other components coupled to the expansion base 70. Thus, as shown in FIG. 2, a South bridge logic device within the expansion base 70 couples the PCI bus to various expansion busses including an ISA bus 81, USB 77 and IDE bus 79. The following discussion focuses on the architecture of the South bridge logic 100. This same architecture may be used (with some minor modifications) if desired, for the South bridge logic within the expansion base 70. Alternatively, the present invention also may be implemented by using a prior art South bridge device in the expansion base 70.

In FIG. 2, the South bridge 100 preferably asserts a FLUSHREQ control signal to the North bridge 50 when a device coupled to the sub-ISA bus 87 requests access to the PCI bus 55. The North bridge 50 responds to FLUSHREQ by flushing one or more of its internal queues (described below with reference to FIG. 4) and preventing the CPU 25 from attempting to run additional cycles on the PCI bus. Once the North bridge 50 has responded in this manner to the receipt of FLUSHREQ, the North bridge asserts MEMACK back to the South bridge which then permits the ISA device to run its cycle on the ISA bus. The present invention solves a conflict that may occur when the South bridge asserts FLUSHREQ while the computer is entering a low power mode of operation.

The South bridge 100 and CPU 25 preferably handle most of the power management activities of the computer system. A power switch 93 connects to the MSIO 92 to initiate a change in the power mode of the computer system. The power switch 93 may include a momentary push button switch, a toggle switch, or any other type of input device for effectuating a change to the computer's power configuration. The MSIO 92 informs the CPU 25 when the power switch 93 has been activated (indicating a need to transition to a predefined low power mode) by asserting a system management interrupt (SMI) signal to the CPU. The CPU generally responds to this SMI by transitioning the computer to a system-wide low power mode of operation. For example, the computer may enter an Idle, Standby, or Hibernation mode specified by the Advanced Power Management (APM) standard, or power states defined by the ACPI standard, or any other desired mode.

The CPU 25 preferably is programmed to perform a number of steps to transition the computer to the desired operational mode when the SMI is asserted by the MSIO 92. These steps are defined in a software routine executed by the CPU to service the SMI request. The steps performed by the CPU depend on the desired operational mode—the steps performed for one mode may differ from the steps performed for other modes. Some of the steps may require the CPU to run one or more cycles on the PCI bus. Additionally, the CPU may disable arbitration of the PCI bus preventing devices, other than the CPU, from running cycles on the PCI bus. As will be detailed below, the present invention solves the conflict between the CPU needing access to the PCI bus, but cannot access the bus because an ISA device has caused the South bridge to assert FLUSHREQ, and the ISA device that cannot complete its cycle because the CPU has disabled PCI arbitration. In general, the South bridge 100 prevents this conflict from occurring by assuring that any pending ISA-to-PCI cycle completes, deasserts FLUSHREQ and prevents FLUSHREQ from being reasserted while the CPU completes the transition of the computer to the low power mode.

Figure 3:
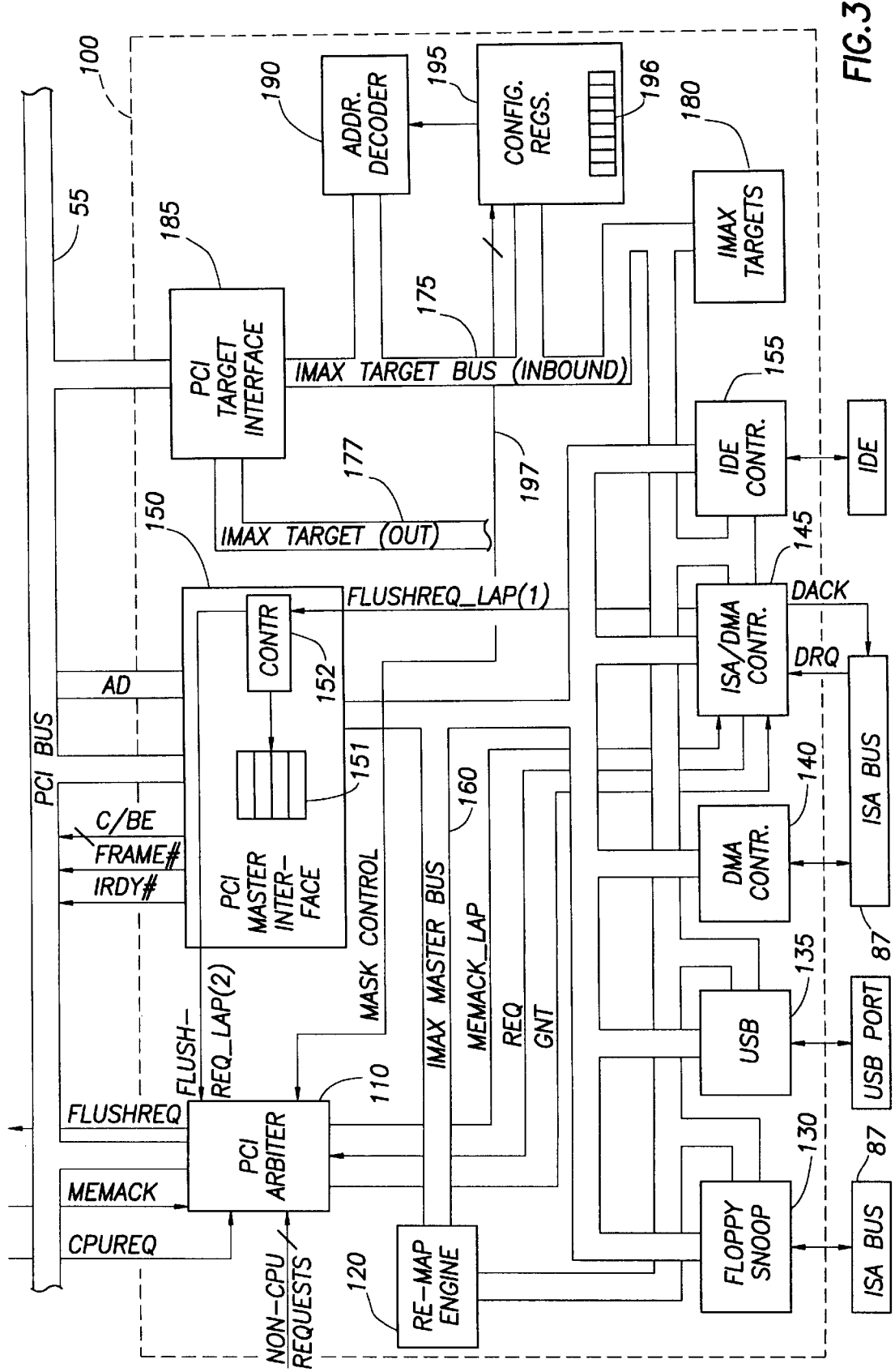
FIG. 3 is a block diagram of the South bridge of FIG. 2.

Referring now to FIG. 3, the South bridge logic 100 constructed in accordance with the preferred embodiment comprises the PCI master interface 150, a PCI target interface 185, a PCI arbiter 110, a plurality of various master devices, an IMAX (Internal Modular ASIC EXpansion) master bus 160 coupling the master devices to the PCI master device 150, and a IMAX target bus coupling a PCI target interface 185 to IMAX targets. The IMAX master devices integrated into the South bridge 100 preferably include a floppy snoop logic 130, USB controller 135, ISA/DMA controller 145, IDE controller 155, and re-map engine 120. Except for the re-map engine 120, each of these masters functions as an interface to an external component or bus.

Although FIG. 3 shows the South bridge 100 connecting to a PCI bus, it should be understood that expansion bus 55 may comprise any type of system bus capable of use in a computer system. Thus, for example, expansion bus 55 may comprise an IEEE standard 1394 ("Fire Wire") bus, or any other suitable bus. Similarly, while bus master interface device 150 is shown as a PCI master, master interface 150 may be modified for use with other bus standards. The only requirement is that master interface must be capable of running master cycles on the expansion bus.

The internal master devices comprise control interfaces within the South bridge associated with components and/or busses external to the South bridge 100. Each of these masters are capable of obtaining mastership of the IMAX master bus 160, and with the assistance of the bus master 150, running master cycles on the PCI bus 55. The USB master 135, therefore, interfaces to the USB and initiates master cycles on the IMAX master bus 160. The IDE IMAX master 155 interfaces to the IDE bus and initiates master cycles on the IMAX master bus 160. The ISA/DMA IMAX master 145 initiates master cycles on the IMAX master bus as part of DMA cycles occurring in the South bridge 100. The IMAX master bus 160 couples the various internal controllers to the PCI master interface 150. Thus, the IMAX master bus 160 preferably includes data, address and control lines for transmitting the necessary information to the PCI bus master 150 to enable that device to execute PCI master cycles.

Referring still to FIG. 3, the PCI Master interface 150 executes PCI cycles on behalf of ISA/DMA bus master 145, the Re-map engine 120, floppy snoop logic 130, USB master 135 and IDE master 155. As a PCI master, the PCI master interface 150 runs memory and I/O read and write cycles on the PCI bus. The PCI master interface 150 also preferably runs memory read line commands when filling ISA/DMA, IDE and USB read line buffers. Thus, the PCI master interface 150 asserts standard PCI protocol signals on the PCI bus 55, including multiplexed address and data signals (AD), and FRAME#, C/BE#, IRDY#. The PCI master interface 150 translates IMAX master cycles from the IMAX masters to PCI cycles.

In the preferred embodiment, the PCI master interface 150 includes internal IMAX arbiter logic that arbitrates mastership of the IMAX bus 160. Although any arbitration scheme may be used, the preferred embodiment implements a least recently used (LRU) arbitration scheme for awarding mastership of the IMAX master bus 160. Once the internal IMAX arbiter unit arbitrates mastership of the IMAX master bus, the PCI master interface 150 issues control signals selecting a particular master. Although not shown specifically in FIG. 3, each of the IMAX masters indicate a request for mastership of the IMAX master bus 160 by asserting a imReq signal to the PCI master interface 150. The PCI master interface 150 awards mastership by returning an imGnt signal to the IMAX awarded mastership.

The PCI target interface 185 monitors PCI bus cycles and determines when to respond. In the preferred embodiment, the PCI target interface 185 couples to an internal address decoder 190 and configuration registers 195. The configuration registers are used to determine if a target is within the South bridge or whether the address is located on the IDE or USB bus. The PCI target interface 185 couples to an IMAX target bus 175 that transmits inbound address, data and control signals to IMAX targets 180. Each of the IMAX masters also preferably constitutes a target for the IMAX target interface 185. The PCI target interface 185 also couples to an IMAX outbound target bus 177 that supplies data from targets during PCI read cycles. More information regarding the IMAX master and target busses for South bridge 100 may be obtained from commonly assigned and co-pending patent applications entitled "Computer System With Bridge Logic That Includes An Internal Modular Expansion Bus And A Common Master Interface For Internal Master Devices" and "Computer System With Bridge Logic That Includes An Internal Modular Expansion Bus And A Common Target Interface For Internal Target Devices."

The address decoder 190 couples to the IMAX target bus 175 and to the configuration registers 195. The address decoder preferably conducts positive decoding of PCI cycles. In addition, in the preferred embodiment the PCI target interface 185 also operates as the subtractive decode agent for the PCI bus. Thus, the PCI target interface 185 claims a PCI cycle by asserting DEVSEL# on the PCI bus 55 when no other PCI device responds to a PCI cycle. These cycles then are passed by the target interface 185 to the ISA bus via the ISA/DMA controller 145.

The PCI arbiter 110 couples to the PCI bus 55 and receives request signals (not shown) from the various PCI masters on the PCI bus (including PCI master interface 150). The PCI arbiter selects one of the requesting masters and assigns the PCI cycle to that master according to known techniques. In the preferred embodiment, the PCI arbiter 110 selects a master from multiple requesting masters based upon a least recently used (LRU) arbitration scheme. Based on this protocol, after a master is granted mastership of the bus 55, the bus is re-arbitrated and the current master is put on the bottom of the priority stack.

Referring still to FIG. 3, the IDE controller 155 operates as both a master and as a target within the South bridge 100. Thus the IDE controller 155 couples to both the IMAX master bus 160 and the IMAX target bus 175. The IDE controller 155 preferably comprises a dual mode controller that couples to IDE interface for the IDE bus. Similarly, the USB controller 135 couples to the USB port on the computer system 10. The USB controller 135 preferably operates as both a master and as a target and thus couples to both the IMAX master bus 160 and to the IMAX target bus 175.

The floppy snoop logic 130 operates as both a South bridge master and target. Thus, floppy snoop 130 couples to the IMAX master bus 160 and to the IMAX target bus 175. In addition, the floppy snoop logic 130 also couples to the floppy drive via the sub-ISA bus as shown in FIG. 3. When a PCI write cycle is made to a floppy address that is shadowed in the expansion base 70, the snoop logic 130 will cause a retry signal to be issued to the PCI master that initiated the cycle to start a delayed transaction. The floppy snoop then initiates the floppy write cycle on the PCI bus through the PCI master interface 150 to shadowed floppy registers in the expansion base 70. At the same time, the floppy snoop logic 130 also runs a write cycle to the MSIO 92 on the sub-ISA bus 87. When the external PCI master retries the write cycle, the snoop logic completes the delayed transaction.

Referring still to FIG. 3, the DMA controller in the ISA/DMA controller logic 145 preferably provides 24 bits of memory address and 16 bits of byte count for each of 7 DMA channels. The ISA/DMA controller 145 presents an 8-bit interface and thus only is programmed with 8-bit I/O instructions. The ISA/DMA controller 145 supports 8 or 16-bit DMA transfers to memory on the PCI (or other expansion) bus 55. The ISA/DMA controller 145 couples to the ISA (or sub-ISA) bus and when the DMA has control of the ISA bus, the ISA/DMA controller 145 translates the DMA commands into the appropriate bus cycles. As shown in FIG. 3, the ISA/DMA controller 145 operates as both a master and as a slave, and thus couples to both the IMAX master bus 160 and the IMAX target busses 175 and 225.

The ISA/DMA controller also provides an electrical interface between the South bridge and the ISA bus. Although only a request signal (DRQ) and an acknowledge signal (DACK) are shown connecting the ISA/DMA controller 145 to the ISA bus, one of ordinary skill in the art will recognize that other well-known ISA bus signals also connect the ISA controller to the ISA bus.

In accordance with the preferred embodiment of the invention, ISA devices connected to the ISA bus assert a DRQ to the ISA/DMA controller 145 when the ISA device needs to run a cycle on the ISA bus. In response to the assertion of DRQ, the ISA/DMA controller asserts FLUSHREQ_LAP(1) to the PCI master interface 150. The PCI master interface 150 generally includes a queue 151 and control logic 152. The queue 151 is used to temporarily store write requests from one or more of the master interfaces (such as the ISA/DMA controller 145). As shown, the queue 151 includes four rows of storage, but can be adapted to provide as much or as little storage as is needed for a given application. The control logic 152 controls or adjusts pointers 153 that determine in which row of storage a new write request is stored ("posted") in queue 151 and from which row a request is taken for placement on to the PCI bus 55.

The queue 151 in the PCI master interface 150 generally operates according to a first in-first out (FIFO) algorithm. That is, the next write request in the queue to be run on the PCI bus 55 is the request that has been waiting in the queue for the longest period of time. If an ISA write request, for example, is placed into the queue at a time when the queue already had other write requests pending, those other write requests will be run before the ISA request is allowed to run. In accordance with the preferred embodiment of the invention, the ISA controller asserts a control signal labeled FLUSHREQ_LAP(1) to the control logic 152 of the PCI master interface 150. In response to the assertion of FLUSHREQ_LAP, the PCI master interface 150 responds by flushing its queue 151 and preventing any additional write requests (other than the ISA cycle) from being stored in the queue. Once the queue 151 is flushed, the control logic 152 then asserts a FLUSHREQ_LAP(2) control signal to the PCI arbiter 110.

The control registers 195 include a register 196 which is called the PCI control register. This register is an eight bit register (bits 0–7). Of the eight bits, bits 1 and 3 are particularly relevant to the present invention. Bit 1 is the PCI request mask bit and can be written as well as read. When bit 1 is set to 1 (high), the PCI arbiter will attempt to mask all requests for access to the PCI bus except for CPU requests to the PCI bus. Accordingly, PCI arbitration is disabled by setting the PCI request mask bit (bit 1). Requests for PCI cycles will not be masked, however, if any device on the PCI bus is locked. Bit 3 is read only and is the masking status bit and when set to 1 indicates that all the requests for PCI cycles, except for CPU requests are masked. The CPU 25 can read both bits 1 and 3 and can set the PCI request mask bit (bit 1).

Figure 4:
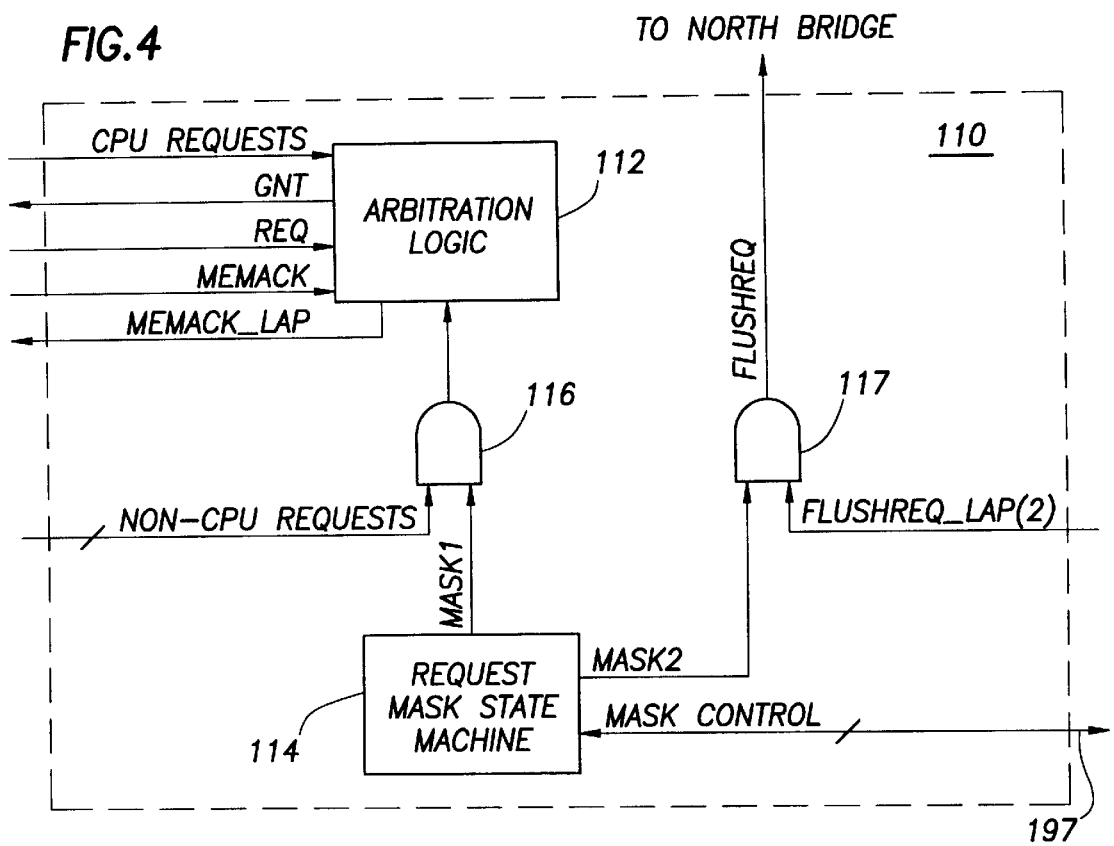
FIG. 4 is a block diagram of an arbitration logic unit in the South bridge of FIG. 3.

Referring now to FIG. 4, the PCI arbiter generally includes arbitration logic 112, a request mask state machine 114 and AND gates 116 and 117. The arbitration logic implements a suitable arbitration algorithm, such as least recently used, to decide among one or more pending requests which request will be granted control of the PCI bus 55. Requests may come from the CPU via the CPU request line or from other devices, collectively illustrated as non CPU requests.

The AND gate 116, or other suitable logic gate, masks off all non-CPU requests by AND'ing the non-CPU requests with MASK1 asserted by the request mask state machine 114. Similarly, the request mask state asserts MASK2 to mask off FLUSHREQ_LAP(2) which comes from the PCI master interface 150. In accordance the procedure described below, the request mask state machine 114 receives a MASK CONTROL signal from the configuration registers 195 when the computer is to transition to a low power state. In response to MASK CONTROL, the request mask state machine masks off the FLUSHREQ_LAP(2) and non-CPU request signals at the appropriate time. Once FLUSHREQ_LAP(2) is masked off by AND gate 117, FLUSHREQ cannot be asserted to the North bridge even if an ISA cycle requests PCI bus access and FLUSHREQ_LAP is asserted internal the South bridge 100. By masking off the FLUSHREQ_LAP(2) and non-CPU request signals the CPU can transition the computer to a low power state without the risk of locking up the computer as described above.

It should be noted that if FLUSHREQ is asserted to the North bridge, the North bridge flushes its internal CPU-to-PCI write queue, prevents any further CPU-to-PCI cycles from starting, and then asserts MEMACK back to the South bridge's PCI arbiter 110. In response to receiving MEMACK, the PCI arbiter 110 asserts a MEMACK_LAP signal to the ISA controller to indicate that the ISA controller can now request access to the PCI bus to complete its cycle. When the ISA/DMA controller 145 is ready to run its cycle, the ISA controller asserts a request (REQ) signal to the PCI arbiter. The PCI arbiter 110 arbitrates for control of the PCI bus and grants control of the bus to the ISA/DMA controller 145 according to its predetermined arbitration protocol. Access to the PCI bus 55 is granted by the PCI arbiter 110 by asserting the grant (GNT) signal to the ISA/DMA controller 145. At this point, the ISA/DMA controller is free to run its cycle through the PCI master interface 150 according to any suitable protocol such as that described in copending application titled "Computer System With Bridge Logic That Includes an Internal Modular Expansion Bus and a Common Master Interface for Internal Master Devices." As one of ordinary skill in the art will recognize, the ISA/DMA controller may start the data transfer for the ISA cycle by asserting the DACK acknowledge signal to the ISA device that initiated the cycle through its DRQ signal. The ISA device will then proceed to place data on the ISA bus for a write cycle or start a read request under the control of the ISA/DMA controller.

Referring now to FIGS. 3 and 4, the procedure for preventing FLUSHREQ from being asserted will now be described. At a desired time during the transition to a low power mode, the CPU sets the PCI request mask bit (bit 1) in the PCI Control Register 196 to signal that all activity on the PCI bus should cease. The PCI arbiter 110 reads bit 1 in register 196. In response, the PCI arbiter monitors the PCI bus 55 and FLUSHREQ signal for activity. If an ISA device has started to request to run a cycle, or is running a cycle on the PCI bus, FLUSHREQ will be asserted. The PCI arbiter preferably waits until the ISA cycle and FLUSHREQ becomes deasserted before masking off the FLUSHREQ_LAP(2) signal to prevent FLUSHREQ from being reasserted. With FLUSHREQ masked, no new ISA cycles can run on the PCI bus. The PCI arbiter also masks all non-CPU requests in response bit 1 set in the PCI control register and the request mask state machine masking the FLUSHREQ. After masking FLUSHREQ and all non-CPU requests, the PCI arbiter 110 sets the masking status bit (bit 3). The CPU monitors bit 3 and continues with the transition to the low power mode when bit 3 is set indicating FLUSHREQ and non-CPU requests are masked.

Figure 5:
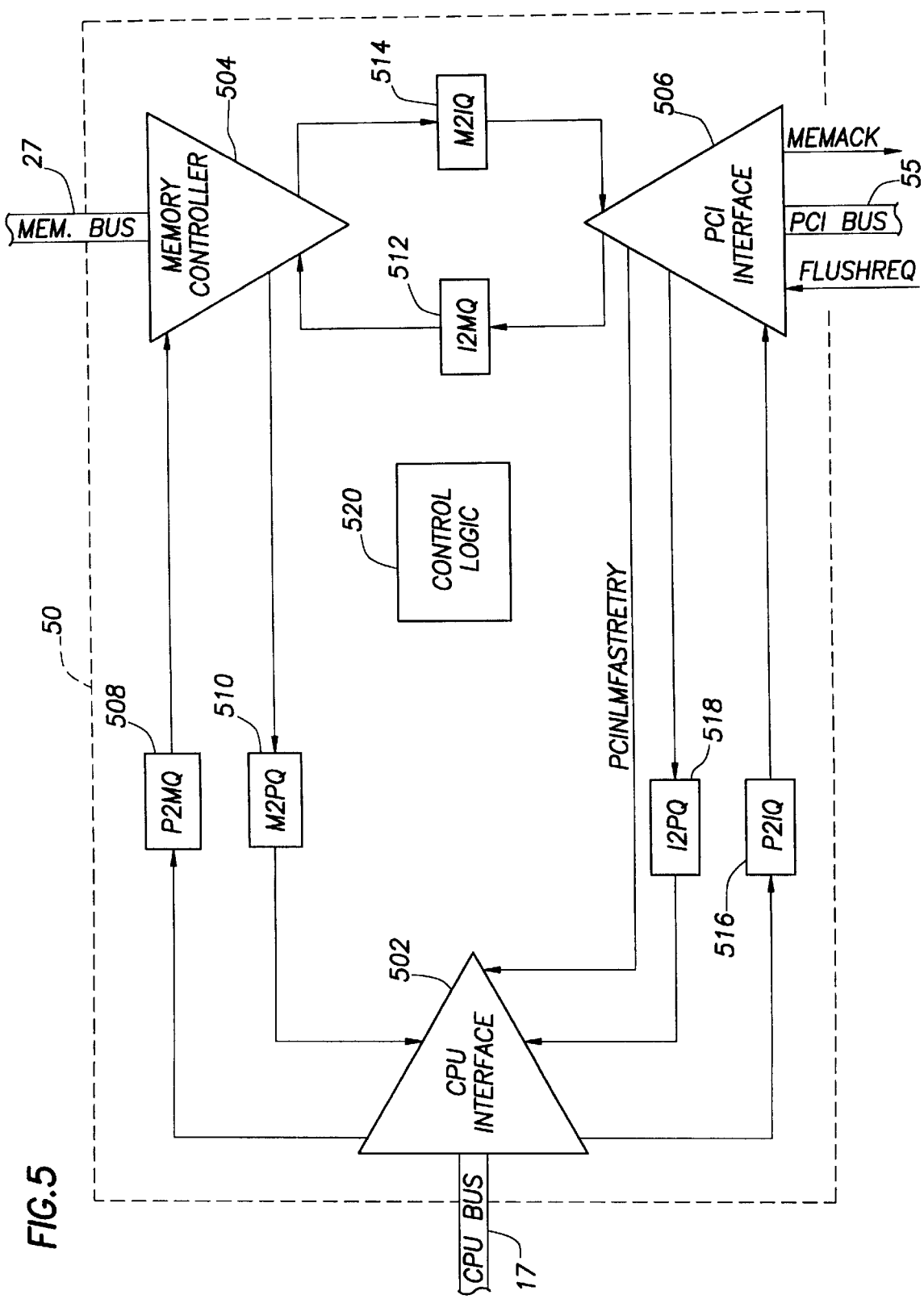
FIG. 5 is a block diagram of the North bridge of FIG. 2.

The following discussion explains what happens to the North bridge 50 once the South bridge 100 asserts FLUSHREQ. Referring to FIG. 5, the North bridge 50 generally includes a CPU interface 502, a memory controller 504 and a PCI interface 506 to interconnect the CPU bus 17, memory bus 27 and PCI bus 55, respectively. A read and a write queue are disposed between each of the interfaces 502, 506, and memory controller 504. Specifically, CPU interface 502 connects to the memory controller 504 via a CPU-to-memory write queue (P2MQ) 508 and a memory-to-CPU read queue (M2PQ) 510. Similarly, the PCI interface 506 connects to the memory controller 504 via a PCI-to-memory write queue (I2MQ) 512 and a memory-to-PCI read queue (M2IQ) 514. Finally, the CPU and PCI interfaces interconnect by way of a CPU-to-PCI write queue (P2IQ) 516 and a PCI-to-CPU read queue (I2PQ) 518. A write request from one bus to another bus are temporarily stored or "posted" to the respective write queue 508, 512, or 516 pending execution by the target bus. Read data returned by a target bus to the bus initiating the read cycle is temporarily stored in the respective read queues 510, 515, or 518 pending retrieval by the bus initiating the read. Control of the read and write queues is performed by the control logic 520 via control lines not shown in FIG. 5 for sake of clarity.

Referring still to FIG. 5, the FLUSHREQ signal asserted by the South bridge 122 preferably is provided to the PCI interface 506 in the North bridge. In response to the South bridge 122 asserting the FLUSHREQ signal, the PCI interface 506 executes (or "flushes") CPU write cycles posted in the P2IQ 516 and, if desired, the P2MQ 508. At approximately the same time, the PCI interface 506 also asserts a PCINLMFASTRETRY control signal to the CPU interface 502. The PCINLMFASTRETRY signal commands the CPU interface to cease posting additional CPU-to-PCI write cycles to the P2IQ 516 and, again if desired, ceases posting CPU-to-memory write cycles in the P2MQ 508. The CPU interface 502 discontinues posting additional write cycles to the write queues using any suitable technique such as retrying any attempted CPU cycles that target the PCI bus 55 or memory 75. The combination of the PCI interface 506 flushing the P2IQ 516 and the CPU interface 502 ceasing the posting of additional CPU-to-PCI write cycles to the P2IQ 156 causes all posted CPU-to-PCI write requests to be completed and the CPU from obtaining any further access to the PCI bus.

As noted above with reference to FIG. 2, computer system 10 may comprise a laptop computer and may be connected to an expansion base 70. In this configuration, both computer system 10 and expansion base 70 include a South bridge as shown. As shown, computer system 10 includes a South bridge 100 and expansion base 70 includes a South bridge 200 in addition to other known components not shown for sake of clarity. The expansion base South bridge generally is similar to the South bridge 100 described above with reference to FIG. 3.

Figure 7:
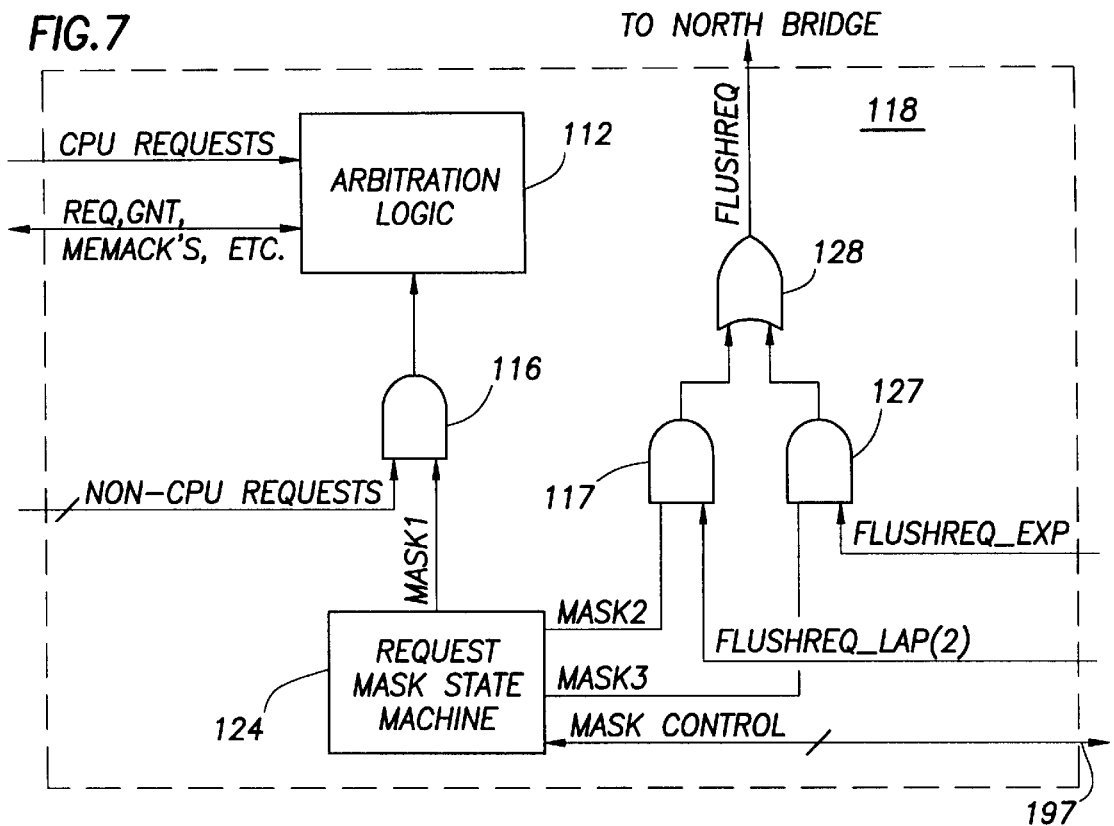
FIG. 7 is a block diagram of an alternative embodiment of an arbitration logic unit.

Referring to FIGS. 6 and 7, the North bridge receives a single FLUSHREQ signal from South bridge 100 even though either South bridge 100 or 200 is capable of asserting a flush request control signal. The South bridge includes a PCI arbiter 118 which preferably includes a logic gate 128 for generating a single FLUSHREQ signal to the North bridge in response to the assertion of a flush request from either or both South bridges. The logic gate 128 may comprise an OR gate as shown, or any other suitable type of logic gate for asserting a single FLUSHREQ in response to an asserted flush request from either South bridge. To distinguish the FLUSHREQ signals from the South bridges in FIG. 6, the FLUSHREQ generated internal to South bridge 100 is labeled FLUSHREQ_LAP and the FLUSHREQ generated by the South bridge 200 in the expansion base is labeled FLUSHREQ_EXP.

The PCI master 250 in South bridge 200 and the PCI master 150 in computer system 10 respond to the assertion of the FLUSHRFQ_EXP and FLUSHREQ_LAP signals from ISA controllers 245 and 145, respectively, according to the preferred embodiment described above. That is, each PCI master flushes its internal write queues and prevents new write requests from being posted once the ISA controllers assert the associated FLUSHREQ signal. Once the queues are flushed for a particular PCI master, that PCI master asserts a FLUSHREQ (FLUSHREQ_EXP or FLUSHREQ_LAP) signal. The OR gate 128 logically OR's together the two FLUSHREQ signals from the PCI masters 150, 250 to generate a single FLUSHREQ signal to the North bridge 50.

The South bridge 200 in the expansion base 70 may be run off of the expansion base's own clock signal. This clock may not be synchronized with the clock that coordinates the cycles that run on the PCI bus. Thus if desired, the flush request signal from the South bridge 200 in the expansion base may be synchronized to the PCI clock signal (PCICLK) from PCI bus 55. The PCICLK is a signal defined as part of the PCI bus standard and is well known to those of ordinary skill in the art. In one embodiment of the invention, South bridge 100 includes a synchronizing circuit 162 to synchronize FLUSHREQ_EXP to PCICLK. Alternatively, North bridge 50 may include the synchronizing circuit instead of the South bridge 100. The synchronizing circuit 162 is implemented as any commonly known circuit for this purpose and generally includes a flip-flop or other type of latching device that is clocked by the PCICLK signal from the PCI bus.

Each South bridge 100, 200 includes a PCI arbiter— South bridge 100 includes PCI arbiter 118 and South bridge 200 includes a PCI arbiter 210. Each arbiter generally performs the functions described above with respect to FIG. 3. PCI arbiter 118 includes AND gates 117 and 127 for masking both flush request signals FLUSHREQ_LAP(2) and FLUSHREQ_EXP from the laptop and expansion base South bridges, respectively. Request mask state machine 124 asserts mask signals MASK2 and MASK3 to AND gates 117 and 127 to mask off each flush request signal individually when each is deasserted. Request mask state machine 124 asserts MASK1 to mask off all non-CPU requests through AND gate 116 as described previously with respect to FIG. 4.

Arbitration logic also includes logic to determine whether the South bridge 100 or 200 has access to the PCI bus 55. If no expansion base is used or the laptop computer system 10 is "undocked" from the expansion base 70, the PCI arbiter 118 will always grant PCI bus arbitration control to laptop PCI arbiter 110. If the laptop computer system 10 is docked to a docking station 70, the PCI arbiter 210 in the South bridge 200 in the expansion base preferably is granted access to the PCI bus arbitration by the PCI arbiter 110 in the computer system 10 according to any suitable arbitration technique. The South bridge 200 can request arbitration control of the PCI bus 55 by asserting a request signal (EXP_ARB_REQ) to the PCI arbiter 118. If control is granted, the PCI arbiter 118 returns a grant signal (EXP_ARB_GNT) to the PCI arbiter 210 to permit expansion base PCI arbiter 210 control of the PCI bus 55.

The PCI arbiter 118 also keeps track of which South bridge, bridge 100 or 200, caused the assertion of the FLUSHREQ signal to the North bridge. When the North bridge 50 returns the MEMACK signal acknowledging that the North bridge has prepared itself for the upcoming ISA cycle (by flushing P2IQ 516, for example), the PCI arbiter 118 asserts a MEMACK signal to the ISA controller that initiated the FLUSHREQ. Thus, if ISA controller 145 initiated the request that caused FLUSHREQ to be asserted, PCI arbiter 118 asserts MEMACK_LAP to ISA controller 145. If ISA controller 245 initiated the request, however, PCI arbiter 118 asserts MEMACK_EXP to ISA controller 245. Once each ISA controller is ready to complete its cycle, that ISA controller asserts a request (REQ) signal to its associated PCI arbiter 118 or 210 which responds with a grant (GNT) once the arbiter 110 or 210 determines that the ISA cycle can run on the PCI bus.

Numerous variations and modifications will become apparent to those skilled in the art once the above disclosure is fully appreciated. It is intended that the following claims be interpreted to embrace all such variations and modifications.

What is claimed:

1. A bridge logic unit coupling a primary expansion bus to a secondary expansion bus, comprising:
   a flush request logic gate that masks a flush request signal, said flush request signal asserted internal to said bridge logic unit in response to a request from a device on the secondary expansion bus to run a cycle on the primary expansion bus; and
   a request mask state machine that determines when to mask said flush request signal.

2. The bridge logic unit of claim 1 further including an arbitration unit that arbitrates access to said primary expansion bus, said arbitration unit includes said request mask state machine and said flush request logic gate.

3. The bridge logic unit of claim 1 wherein said flush request logic gate comprises an AND gate.

4. The bridge logic unit of claim 1 further including a non-CPU request logic gate for masking requests from non-CPU devices to run cycles on said primary expansion bus.

5. The bridge logic unit of claim 4 wherein said non-CPU request logic gate comprises an AND gate.

6. The bridge logic unit of claim 4 wherein said request mask state machine masks said flush request signal and said non-CPU device requests to run cycles on said primary expansion bus by individually asserting a flush request mask signal and a non-CPU request mask signal to said flush request and non-CPU request logic gates, respectively.

7. The bridge logic unit of claim 1 further including a programmable control register including a request mask bit that when set causes the request mask state machine to start the process to assert said flush request mask signal to said flush request logic gate.

8. The bridge logic unit of claim 1 further including a programmable control register including a request mask bit that when set causes the request mask state machine to start the process to assert said non-CPU request mask signal to said non-CPU request logic gate.

9. The bridge logic unit of claim 8 wherein said programmable control register also includes a masking status bit that is set by the request mask state machine when the flush request signal and non-CPU request signals are masked.

10. A computer system, comprising:
   a CPU;
   a main memory;
   a primary expansion bus; and
   a bridge logic device connected to said primary expansion bus, said bridge logic coupling external peripheral devices to said primary expansion bus for running cycles on said expansion bus;
   wherein said bridge logic includes:
   a flush request logic gate that masks a flush request signal, said flush request signal asserted internal to said bridge logic unit in response to a request from a peripheral to run a cycle on the primary expansion bus; and
   a request mask state machine that determines when to mask said flush request signal.

11. The computer system of claim 10 wherein said bridge logic includes an arbitration unit for arbitrating for access to said primary expansion bus, said arbitration unit includes said request mask state machine and said flush request logic gate.

12. The computer system of claim 10 wherein said flush request logic gate comprises an AND gate.

13. The bridge logic unit of claim 10 wherein said bridge logic unit further includes a non-CPU request logic gate that masks requests from non-CPU devices to run cycles on said primary expansion bus.

14. The bridge logic unit of claim 13 wherein said non-CPU request logic gate comprises an AND gate.

15. The bridge logic unit of claim 13 wherein said request mask state machine masks said flush request signal and said non-CPU device requests to run cycles on said primary expansion bus by individually asserting a flush request mask signal and a non-CPU request mask signal to said flush request and non-CPU request logic gates, respectively.

16. The computer system of claim 10 wherein said bridge logic further includes a programmable control register including a request mask bit that when set causes the request mask state machine to assert said flush request mask signal to said flush request logic gate.

17. The computer system of claim 10 wherein said bridge logic further includes a programmable control register including a request mask bit that when set causes the request mask state machine to assert said non-CPU request mask signal to said non-CPU request logic gate.

18. The bridge logic unit of claim 17 wherein said programmable control register also includes a masking status bit that is set by the request mask state machine when the flush request signal is masked.

19. A method for preventing a conflict between a CPU transitioning a computer system to a low power mode of operation and a cycle to be run on an expansion bus, comprising:

asserting a system management interrupt (SMI) to said processor;

setting a control bit in a control register;

responding to said control bit by monitoring an expansion bus for activity;

masking a flush request signal to prevent said flush request signal from being asserted when said expansion bus is idle and the flush request signal is deasserted; and setting a status bit in said control register to indicate that said flush request signal is masked.

20. The method of claim 19 further including masking requests for access to the expansion bus from non-CPU devices.

21. The method of claim 19 wherein said masking a flush request signal step includes logically AND'ing a flush request mask signal with a flush request signal generated in response to a device requesting a cycle to be run on the expansion bus.

22. The method of claim 20 wherein masking requests for access to the expansion bus includes logically AND'ing a non-CPU request mask signal with a non-CPU request signals.

23. A computer system, including:
   a CPU;
   a main memory;
   a primary expansion bus;
   a North bridge coupling together said CPU, main memory and said primary expansion bus; and
   a primary South bridge coupled to a secondary expansion bus and said primary expansion bus, comprising:
   a flush request logic gate that masks a flush request signal, said flush request signal asserted internal to said primary South bridge in response to a request from a peripheral to run a cycle on the primary expansion bus; and
   a request mask state machine that monitors said flush request signal and masks said flush request signal when said flush request signal is deasserted.

24. The computer system of claim 23 further including an expansion base and a secondary South bridge in said expansion base, wherein said secondary South bridge is capable of asserting a flush request signal to said primary South bridge.

25. The computer system of claim 24 wherein further including a pair of AND gates for individually masking flush request signals asserted by primary and secondary South bridges.

26. The computer system of claim 25 wherein said request mask state machine individually masks said flush request signals from said primary and secondary South bridges when a control bit is set in a primary expansion bus control register and each flush request signal is deasserted.

27. A bridge logic unit coupling a primary expansion bus to a secondary expansion bus, comprising:
   a means for masking a flush request signal, said flush request signal asserted internal to said bridge logic unit in response to a request from a device on the secondary expansion bus to run a cycle on the primary expansion bus; and
   a means for determining when to mask said flush request signal.

* * * * *